H. N. EDENS.
TRANSMISSION AND CLUTCH OPERATING MEANS.
APPLICATION FILED NOV. 29, 1918.
1,316,433.
Patented Sept. 16, 1919.
2 SHEETS—SHEET 2.
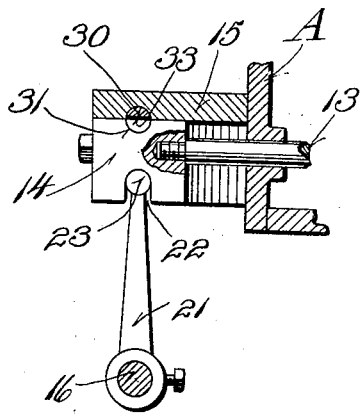
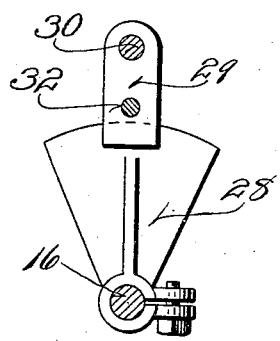
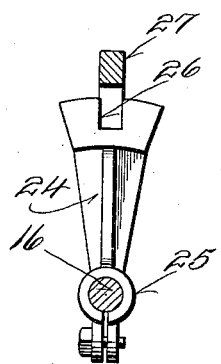
WITNESS:
J. F. Britt
INVENTOR
Henry N. Edens
BY Geo. W. Young
ATTORNEY

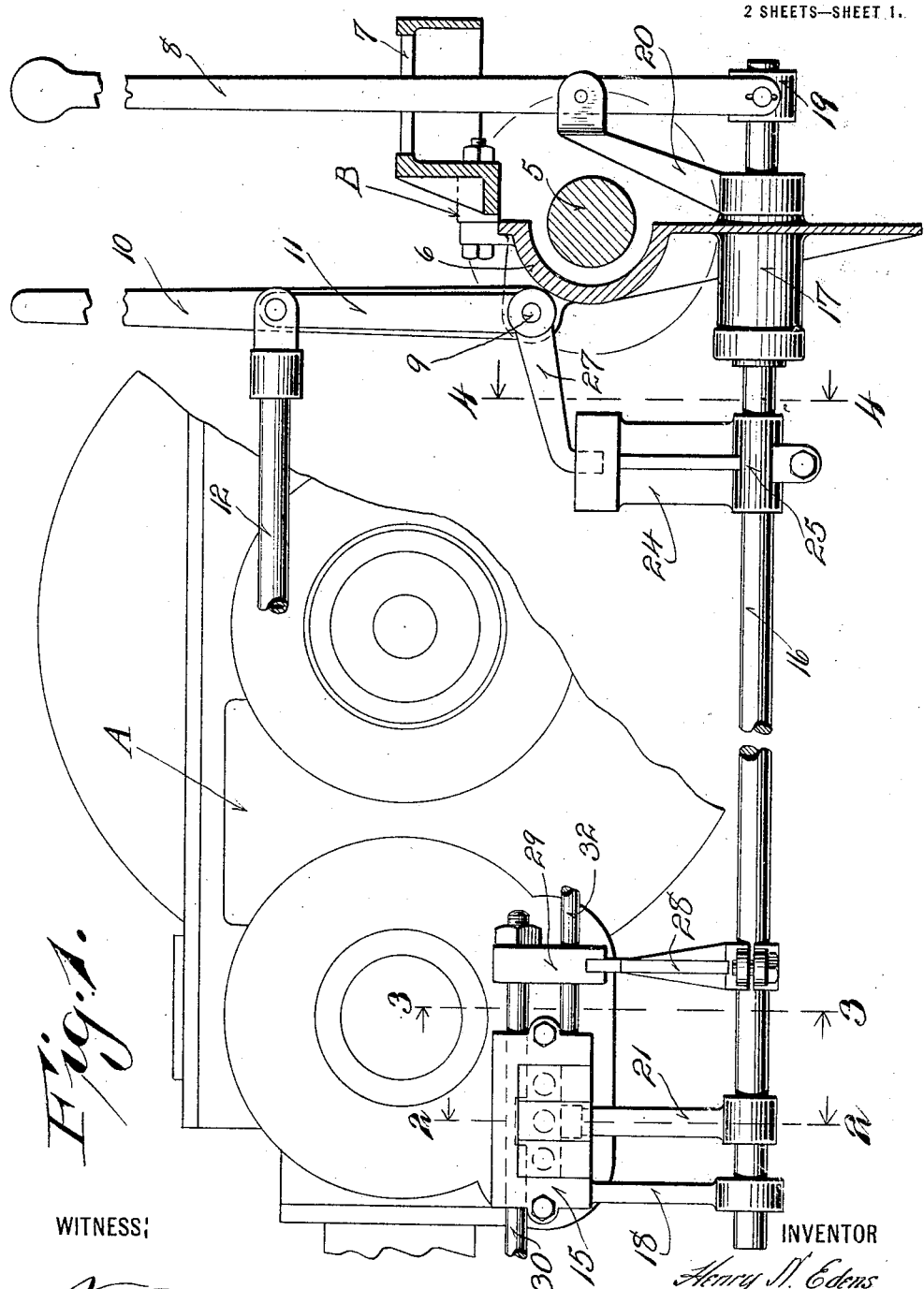

UNITED STATES PATENT OFFICE.

HENRY N. EDENS, OF NEW HOLSTEIN, WISCONSIN, ASSIGNOR TO THE JOHN LAUSON MANUFACTURING COMPANY, OF NEW HOLSTEIN, WISCONSIN.

TRANSMISSION AND CLUTCH OPERATING MEANS.

1,316,433.   Specification of Letters Patent.   Patented Sept. 16, 1919.

Application filed November 29, 1918. Serial No. 264,585.

*To all whom it may concern:*

Be it known that I, HENRY N. EDENS, a citizen of the United States, and resident of New Holstein, in the county of Calumet and State of Wisconsin, have invented certain new and useful Improvements in Transmission and Clutch Operating Means; and I do hereby declare that the following is a full, clear, and exact description thereof.

My invention relates to new and useful improvements in devices associated with the actuating means of the clutch and variable speed transmission mechanisms of a power unit whereby to prevent the operation of either actuating means under such relative conditions of the mechanisms as will cause damage to the transmission gearing, the device being particularly adapted for use in connection with variable speed transmissions of the type shown in my co-pending application and including a plurality of shift members selectively movable to and from a neutral position whereby to determine various driving relations of the transmission gears.

It is in general the object of my invention to simplify and otherwise improve the construction and the operative efficiency of devices of this character.

A more detailed object resides in the provision of an arrangement preventing actuation of the clutch except when one of the shift rods of the transmission mechanism is in full operating position, or when all of the rods are in neutral position.

A further object resides in the provision of an arrangement whereby upon actuation of one of the gear shift members, the remaining members are positively locked in neutral position.

A still further object resides in the provision of a control device, accomplishing the foregoing objects and adapted particularly for use in connection with that type of transmission actuating means including a rod mounted for longitudinal shifting movement to select the shifting member desired for moving the shifting member by rocking movement of the shaft.

With the above and other objects and advantages in view, which will be apparent as the description proceeds, my invention resides in the novel features of construction, combination and arrangement of parts as hereinafter described and defined by the appended claims.

In the accompanying drawings:

Figure 1 is an elevational view showing my improved control device associated with the clutch operating means and the transmission gear operating means of an automobile power plant.

Fig. 2 is a detail sectional view on the line 2—2 of Fig. 1, showing one of the gear shift blocks and its mounting.

Fig. 3 is a detail sectional view on the line 3—3 of Fig. 1, and

Fig. 4 is a detail sectional view on the line 4—4 of Fig. 1, showing the lock for the clutch operating means.

Referring now more particularly to the accompanying drawings, A designates conventionally the casing of a variable speed transmission mechanism such as shown in my said co-pending application and B designates the rear axle structure of a truck type of vehicle, including the axle 5 and a housing portion 6 which carries at its top a guide bracket 7 for the gear shift lever 8 of the variable speed transmission. A clutch control shaft 9 is also mounted on this housing and carries an upstanding actuating lever 10 in convenient position for the operator and an upstanding arm 11 connected by a forwardly extending link 12 with the clutch (not shown).

For actuating the shifting transmission gears in the casing A, which may be of any desired nature with respect to the present invention and hence are not specifically shown, a plurality of, in the present instance three, shifting rods 13 project from the casing and each of these rods has its projecting end threaded in or otherwise secured to a slide block 14, said slide blocks being in mutual sliding connection and mounted in a housing 15 carried on the side of the casing A. For selectively actuating these slide blocks to and from a neutral position wherein said blocks are disposed in alinement, a shaft 16 is slidably and rotatably mounted in a bearing sleeve 17 carried by the lower portion of the housing 6 and in a hanger bearing 18 depending from the remote end of the block housing 15. The lower end of the lever 8 is bifurcated and pivoted on a collar 19 mounted on the rear end of the shaft, and substantially midway between the shaft and the guide bracket 7 the lever is pivotally connected with a bracket arm 20 journaled on and upstanding from the bearing sleeve 17. Thus the lever may be either rocked on the arm 20 as a fulcrum to shift the shaft longitudinally, or rocked on the collar 19 as a fulcrum to rock the shaft. Adjacent the slide blocks 14, an upstanding arm 21 is fixed on the shaft and the blocks are provided in their lower portions with transverse channels 22 adapted to aline when the blocks are in neutral position, and to selectively receive a rock head 23 on the upper end of the arm.

Thus rocking movement of the lever 8 to shift the shaft longitudinally serves to select the shifting operation desired, by reason of the disposition of the head 23 in a selective one of the blocks, and rocking movement of the lever 8 to rock the shaft will effect the shifting operation by sliding the selected block through the medium of the arm 21. It may be at this point noted that in the present arrangement the central block 14 moves away from the casing to effect the gear shift which it controls, while the other blocks move toward the casing to effect their gear shifts.

Actuation of the clutch to driving position is prevented in intermediate position of any one of the gear shifting members by means of a segment block 24 upstanding from the shaft 16 adjacent its rear end and carried on a split collar 25 clamped on said shaft, the top of the segment block being curved concentric with the shaft 16, and provided with a groove 26 extending substantially parallel to the shaft. An arm 27 extends rearwardly from the clutch lever rock shaft 9 and has its free end downwardly engaged and adapted to abut the top of the block. The block is of such width longitudinally of the shaft 16 that its ends will not move past the abutting portion of the arm in the various shifting movements of the shaft for selective engagement of its rock arm with the slide blocks 14. In the operating position of the clutch link 12, the shaft 9 is swung so that its arm moves past the path of the periphery of the block 24, and the width of the peripheral block portions between the central groove 26 and the sides of the block are such that either side of the block moves slightly past the arm 27 in completing the shifting movement of a selected shift block. Thus, the clutch is positively held from actuation until a gear shift movement is completed, by abutment of the end of the arm 27 with the periphery of the segment block 24, but when all of the gear shifting members are in neutral position, the central groove 26 of said block may receive the arm 27 to permit actuation of the clutch.

Adjacent the guide block housing 15, a segment plate 28 is secured in upstanding relation on the shaft 16, and the peripheral portion of this plate is slidably engaged in a transverse groove in the bottom portion of a shifting block 29 which is secured to and depends from a cylindrical bar 30 slidable in the upper portion of the housing 15 and in channels 31 formed in the upper portions of the slide blocks, said channels being in alinement, similar to the recesses or channels 22 of the lower portions of the blocks, when all of said blocks are in neutral position. The shift block 29 which controls sliding movement of the bar 30 is guided by a bar 32 projecting from the end of the housing 15 and slidably passed through said block. The bar 30 and the rock arm head 23 thus move in unison, and the bar 30 is cut away at 33 immediately above the head 23, the width of this cut-away portion being slightly greater than the width of one of the slide blocks, while the width of the head 23 is slightly less than the width of one of the slide blocks. Thus, when the head 23 is disposed entirely within one of the grooves or channels 22 of a selective slide block, the cutaway portion 33 of the bar 30 affords a clearance for the slide block, while the other portions of the bar positively lock the remaining slide blocks in neutral position. Thus accidental shifting movement of a plurality of the slide blocks is positively prevented.

An exceedingly simple and positive device has thus been provided which positively prevents actuation of the clutch and such release of the transmission gears as might cause damage thereto.

I claim:

1. A structure of the class described including a clutch operating member, a slidably and rotatably mounted gear shift operating shaft, a segment block on the shaft, and a member associated with and controlling actuation of the clutch operating member and engageable with the segment block in intermediate positions of the shaft for preventing actuation of the clutch operating member in such intermediate positions of the shaft.

2. A structure of the class described including a clutch actuating rock shaft, a slidably and rotatably mounted gear shift operating shaft, a segment block on the shaft, and an arm on the clutch operating shaft engageable with said segment block in various intermediate positions of the gear shift operating shaft.

3. A structure of the class described including a clutch actuating rock shaft, a slidably and rotatably mounted gear shift operating shaft, movable in rocking movement in both directions from a neutral position to certain operating positions, a segment block on the shaft provided with an intermediate recess, and a movable member associated with and controlling actuation of the clutch operating member and engageable in the recess of the block in neutral position of the shaft and adapted to abut the block in various intermediate positions of the shaft.

In testimony that I claim the foregoing I have hereunto set my hand at New Holstein, in the county of Calumet and State of Wisconsin.

HENRY N. EDENS.

Copies of this patent may be obtained for five cents each, by addressing the "Commissioner of Patents, Washington, D. C."